(12) United States Patent
Pechanek et al.

(10) Patent No.: US 7,730,280 B2
(45) Date of Patent: Jun. 1, 2010

(54) METHODS AND APPARATUS FOR INDEPENDENT PROCESSOR NODE OPERATIONS IN A SIMD ARRAY PROCESSOR

(75) Inventors: Gerald George Pechanek, Cary, NC (US); Edwin Franklin Barry, Vilas, NC (US); Mihailo M. Stojancic, Berkeley, CA (US)

(73) Assignee: Vicore Technologies, Inc., Berkeley, CA (US)

( * ) Notice: Subject to any disclaimer, the term of this patent is extended or adjusted under 35 U.S.C. 154(b) by 328 days.

(21) Appl. No.: 11/736,814

(22) Filed: Apr. 18, 2007

(65) Prior Publication Data

US 2008/0046685 A1 Feb. 21, 2008

Related U.S. Application Data

(60) Provisional application No. 60/813,915, filed on Jun. 15, 2006.

(51) Int. Cl.
*G06F 15/76* (2006.01)

(52) U.S. Cl. .................... 712/20; 712/215; 712/21; 712/22

(58) Field of Classification Search .............. 712/20, 712/21, 22, 215
See application file for complete search history.

(56) References Cited

U.S. PATENT DOCUMENTS

| | | | | |
|---|---|---|---|---|
| 5,165,023 A | * | 11/1992 | Gifford | 710/317 |
| 5,475,856 A | * | 12/1995 | Kogge | 712/20 |
| 5,581,778 A | * | 12/1996 | Chin et al. | 712/16 |
| 5,606,520 A | * | 2/1997 | Gove et al. | 708/491 |
| 5,664,214 A | * | 9/1997 | Taylor et al. | 712/20 |
| 5,842,031 A | * | 11/1998 | Barker et al. | 712/23 |
| 6,622,234 B1 | | 9/2003 | Pechanek et al. | |
| 7,257,696 B2 | | 8/2007 | Pechanek et al. | |
| 7,320,065 B2 | * | 1/2008 | Gosior et al. | 712/227 |
| 7,506,135 B1 | * | 3/2009 | Mimar | 712/22 |

(Continued)

OTHER PUBLICATIONS

Howard Jay Siegel, Thomas Schwederski, West Lafayette, Nathaniel J. Davis, West Lafayette, James T. Kuehn "PASM: a reconfigurable parallel system for image processing", ACM, Jul. 1984.*

(Continued)

*Primary Examiner*—Eddie P Chan
*Assistant Examiner*—Idriss N Alrobaye
(74) *Attorney, Agent, or Firm*—Heimlich Law, PC; Alan Heimlich, Esq.

(57) ABSTRACT

A control processor is used for fetching and distributing single instruction multiple data (SIMD) instructions to a plurality of processing elements (PEs). One of the SIMD instructions is a thread start (Tstart) instruction, which causes the control processor to pause its instruction fetching. A local PE instruction memory (PE Imem) is associated with each PE and contains local PE instructions for execution on the local PE. Local PE Imem fetch, decode, and execute logic are associated with each PE. Instruction path selection logic in each PE is used to select between control processor distributed instructions and local PE instructions fetched from the local PE Imem. Each PE is also initialized to receive control processor distributed instructions. In addition, local hold generation logic is associated with each PE. A PE receiving a Tstart instruction causes the instruction path selection logic to switch to fetch local PE Imem instructions.

15 Claims, 7 Drawing Sheets

U.S. PATENT DOCUMENTS

2003/0093655 A1* 5/2003 Gosior et al. .............. 712/228
2003/0107751 A1* 6/2003 Tanaka ...................... 358/1.2
2007/0250688 A1* 10/2007 Kyou ......................... 712/215
2008/0133892 A1 6/2008 Pechanek et al.

OTHER PUBLICATIONS

H. J. Siegel, L. J. Siegel, F. C. Kemmerer, P. T. Mueller, Jr., H. E. Smalley, and S. D. Smith, "PASM: a partitionable SIMD/MIMD system for image processing and pattern recognition," IEEE Trans. Computers, vol. C-30, Dec. 1981, pp. 934-947.*

Howard Jay Siegel, John K. Antonio, Richard C. Metzger, Min Tan, Yan Alexander Li "Heterogeneous Computing", ECE Technical Reports, Purdue Libraries, Dec. 1994.*

Berg, T.B.; Siegel, H.J., "Instruction execution trade-offs for SIMD vs. MIMD vs. mixed mode parallelism," Parallel Processing Symposium, 1991. Proceedings., Fifth International , vol., No., pp. 301-308, Apr. 30-May 2, 1991.*

David Lee Tuomenoksa, Howard Jay Siegel "Task Scheduling on the {PASM} Parallel Processing System" IEEE-TSE 11(2):145-157, Feb. 1985.*

* cited by examiner

Thread start (Tstart): Encoding

Fig. 2B

Thread stop (Tstop): Encoding

METHODS AND APPARATUS FOR INDEPENDENT PROCESSOR NODE OPERATIONS IN A SIMD ARRAY PROCESSOR

RELATED U.S. APPLICATION DATA

The present application claims the benefit of U.S. Provisional Application No. 60/813,915, filed Jun. 15, 2006, which is incorporated by reference herein in its entirety.

FIELD OF THE INVENTION

The present invention relates generally to improvements in parallel data processing architectures for video processing and more particularly to apparatus and methods for independent processor node operations in a single instruction multiple data (SIMD) array processor.

BACKGROUND OF THE INVENTION

Increasing demand for high definition TV products, including interactive TV in a HD format and HD video compression encoding and decoding, requires increasing sophistication, flexibility, and performance in the supporting electronics. The sophistication, flexibility, and performance requirements for HD TV exceeds the capabilities of current generations of processor architectures by, in many cases, orders of magnitude.

The demands of video encoding for HD formats are both memory and data processing intensive, requiring efficient and high bandwidth memory organizations coupled with compute intensive capabilities. In addition, a video encoding product must be capable of supporting multiple standards each of which includes multiple optional features which can be supported to improve image quality and further reductions in compression bandwidth. Due to these multiple demands, a flexible parallel processing approach must be found to meet the demands in a cost effective manner.

A number of algorithmic capabilities are generally common between multiple video encoding standards, such as MPEG-2, H.264, and SMPTE-VC-1. Motion estimation/compensation and deblocking filtering are two examples of general algorithms that are required for video encoding. To efficiently support motion estimation algorithms and other complex programmable functions which may vary in requirements across the multiple standards, a processor by itself would require significant parallelism and very high clock rates to meet the requirements. A processor of this capability would be difficult to develop in a cost effective manner for commercial products.

Two primary parallel programming models, the SIMD and the MIMD models are typically used in commercial parallel processors. In the SIMD model, a single program thread controls multiple processing elements (PEs) in synchronous lock-step operation. Each PE executes the same instruction but on different data. This is in contrast to the MIMD model where multiple program threads of control exist and any inter-processor operations must contend with the latency to synchronize the independent program threads prior to communicating. The problem with SIMD is that not all algorithms can make efficient use of the available parallelism existing in the processor. The amount of parallelism inherent in different algorithms varies leading to difficulties in efficiently implementing a wide variety of algorithms on SIMD machines. The problem with MIMD machines is the latency of communications between multiple processors leading to difficulties in efficiently synchronizing processors to cooperate on the processing of an algorithm. Typically, MIMD machines also incur a greater cost of implementation as compared to SIMD machines, since each MIMD PE must have its own instruction sequencing mechanism which can amount to a significant amount of hardware. MIMD machines also have an inherently greater complexity of programming control required to manage the independent parallel processing elements. Consequently, levels of programming complexity and communication latency occur in a variety of contexts when parallel processing elements are employed. It will be highly advantageous to efficiently address such problems as discussed in greater detail below.

SUMMARY OF THE INVENTION

In one or more of its several aspects, the present invention addresses problems such as those described above. In one of its aspects, the present invention describes an apparatus that allows improvements in processor node capability in a SIMD array processor.

An embodiment of the present invention addresses an apparatus for parallel processing. A control processor is used for fetching and distributing single instruction multiple data (SIMD) instructions to a plurality of processing elements (PEs), wherein one of the SIMD instructions is a thread start (Tstart) instruction which causes the control processor to pause its instruction fetching. A local PE instruction memory (PE Imem) is associated with each PE and contains local PE instructions for execution on the local PE. Local PE Imem fetch, decode, and execute logic are associated with each PE. Instruction path selection logic in each PE is used to select between control processor distributed instructions and local PE instructions fetched from the local PE Imem. Each PE is also initialized to receive control processor distributed instructions. In addition, local hold generation logic is associated with each PE. A PE receiving a Tstart instruction causes the instruction path selection logic to switch to fetch local PE Imem instructions.

Another embodiment of the present invention addresses a method of enabling multiple instruction multiple data (MIMD) operations in a single instruction multiple data (SIMD) array processor. Receiving a thread start (Tstart) instruction in a control processor and in a plurality of enabled processing elements (PEs). Generating a hold signal in the control processor based on the Tstart instruction to pause the control processor from fetching and distributing instructions to the PEs. Switching instruction paths in each PE to a local PE instruction memory (PE Imem) path in response to the Tstart instruction received in each enabled PE. In addition, fetching instructions from the local PE Imem independently in each PE for execution locally on each PE.

Another embodiment of the present invention addresses a method for executing very long instruction words (VLIWs) separately on individual processing elements (PEs). Receiving a thread start (Tstart) instruction in a control processor and in a plurality of enabled processing elements (PEs). Generating a hold signal in the control processor based on the Tstart instruction to pause the control processor from fetching and distributing instructions to the PEs. Switching instruction paths in each PE to a local PE instruction memory (PE Imem) path based on in response to the Tstart instruction received in each enabled PE. In addition, fetching a PE execute VLIW (PEXV) from the local PE Imem and executing the PEXV instruction separately on the PE that fetched the PEXV instruction.

These and other features, aspects, techniques, and advantages of the present invention will be apparent to those skilled in the art from the following detailed description, taken together with the accompanying drawings and claims.

DETAILED DESCRIPTION

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

Further details of attaching an application specific hardware assist function within an array processor for use in conjunction with the present invention is found in U.S. Provisional Application Ser. No. 60/795,140 entitled "Methods and Apparatus for Attaching Application Specific Functions Within an Array Processor" filed Apr. 26, 2006 and incorporated by reference herein in its entirety.

Figure 1:
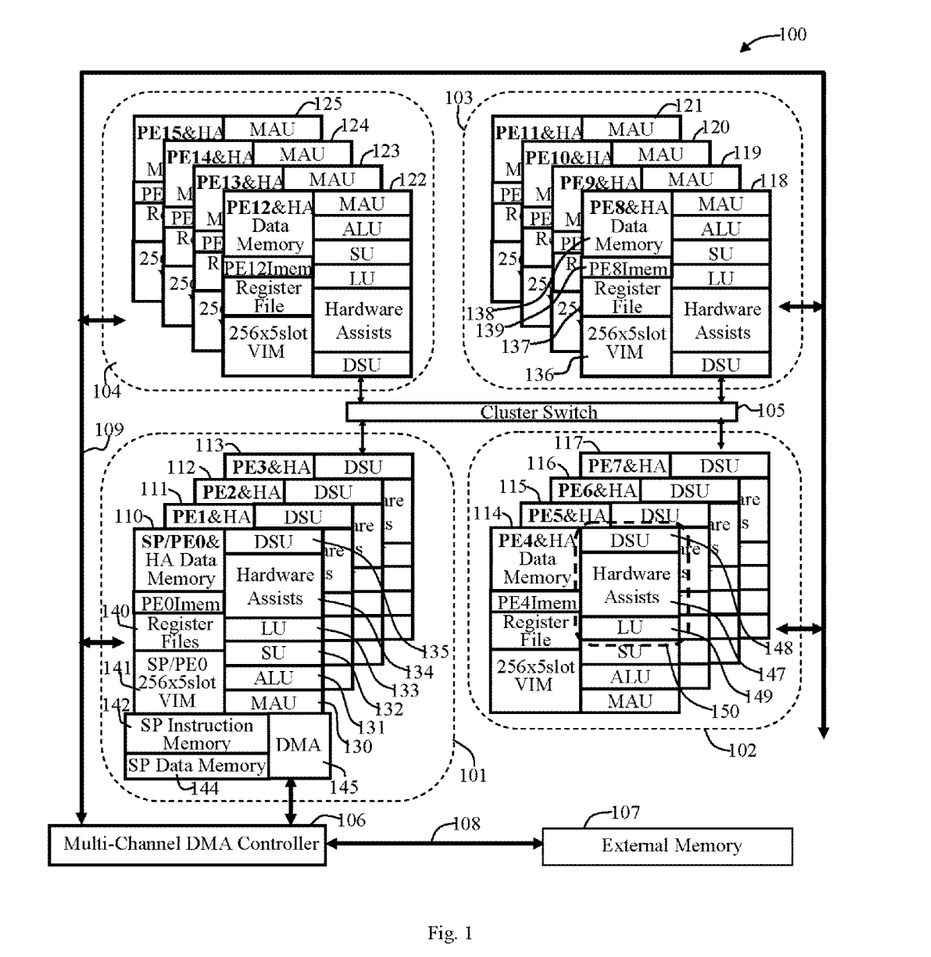
FIG. 1 illustrates a sixteen node video signal processor (VSP$_{16}$) in accordance with one or more embodiments of the present invention.

FIG. 1 illustrates a sixteen-node video signal processor (VSP$_{16}$) 100 in accordance with one or more embodiments of the present invention. The VSP$_{16}$ 100 contains four transform engine (TE) clusters 101-104, an interconnection network cluster switch 105, a multi-channel direct memory access (DMA) controller 106, and an external memory 107. The DMA controller 106 interfaces with the external memory 107 over an external memory bus 108 to transfer data to and from the external memory to each of the TE clusters over a multi-channel DMA bus 109. Generally, the PEs are organized in an N×N array, for example, as a N=4 4×4 array of PEs as shown in FIG. 1.

A controlling function sequence processor (SP) combined with processing element zero (PE0) functions is indicated as SP/PE0 110. The SP/PE0 shares execution units between the SP control function and the PE0 data processing function. To support the SP and PE0, a separate SP register file and a separate PE0 register file are used. The two separate register files are indicated with one block as an (SP/PE) register file 140 that is used to maintain the processing context of the SP and PE0.

SP/PE0 110 and fifteen additional processor engines (PEs) 111-125 are partitioned in groups of four PEs per cluster as a 4×4 array organization. Each PE provides programmable processing and hardware assist functions. SP/PE0 110 is unique as compared to the other fifteen PEs 111-125, having an array controlling function combined with the PE function of PE0. The common features of the sixteen PEs 110-125 include a set of instruction execution units including, for example for PE0, a multiply accumulate unit (MAU) 130, an arithmetic logic unit (ALU) 131, a store unit (SU) 132, a load unit (LU) 133, a hardware assist (HA) 134, a data select unit (DSU) 135, and for example for PE8, a 256×5 slot very long instruction word memory (VIM) 136, a local PE register file 137, a data memory 138 local to each PE and HA, and a local PE instruction memory (PE#Imem) 139 in accordance with the present invention and as described in more detail below. Each PE also contains local pipeline controls, decode logic, and control logic appropriate for each PE. All VSP$_{16}$ instructions are executed in a simple pipeline with a majority of instructions requiring a single execution stage and a few instructions requiring two execution stages that are pipelined.

To control the VSP$_{16}$ the SP generally has a single thread of control supported by an SP instruction memory 142 and an SP data memory 144. The SP provides program control, contains instruction and data address generation units, supports interrupts, provides DMA control, and dispatches instructions to the PEs 110-125. The SP executes branches and controls the fetching and issuing of instructions such as load VLIW and execute VLIW instructions. Though not limited to this, the SP/PE0 shares a single VIM 141. The load VLIW instruction may be an SP only instruction or a PE instruction that is broadcast to all the PEs. The Load VLIW instruction provides an indirect VIM address and is used to load the instruction slots at the specified VIM address. The execute VLIW instruction may also be an SP only instruction or a PE instruction that is broadcast to all the PEs. The execute VLIW instruction causes a VLIW to be selected at a specified indirect VIM address and executed.

The single SP thread of control supports 4×4 single instruction multiple data (SIMD) sub-threads which operate synchronously in lock step SIMD fashion. Each SIMD sub-thread uses very long instruction words (VLIWs) which are indirectly selected and executed by the single SP thread. Each VLIW in each PE at the same VIM address may be different. All unmasked PEs access the same VIM address when executing a VLIW. Five 32-bit instruction slots are provided in each PE, such that with 16 PEs 80 32-bit instructions can execute simultaneously. In addition single, dual, quad, and octal packed data operations may be specified independently by each slot instruction thereby supporting up to 640 instruction specified operations per cycle. As an example of the processing power this provides, a VSP$_{16}$ operating at 250 Mhz may achieve 160 Giga operations per second.

The single SP thread of control also enables 4×4 multiple instruction multiple data (MIMD) independent program threads which operate on the PEs. Once the SP enables the MIMD threads, each PE independently fetches instructions from a local PE Imem for local execution until a local PE stop instruction is fetched from the local PE Imem, as described in further detail below.

The VSP$_{16}$ processor also uses an interconnection network cluster switch 105 providing single cycle data transfers between PEs within clusters and between PEs in orthogonal clusters. The communication operations are controlled by a DSU instruction which can be included in a VLIW thereby overlapping communications with computations which with proper software pipelining the communication latency can be reduced to zero. The communication operations operate independently of the DMA which may operate in the background to stream data between the local PE memories and the external memories.

To support additional processing capability for application specific functions such as motion estimation/compensation and other high compute functions, a hardware assist (HA) unit with advantageous independent connections to local PE memory is provided. A HA unit has one or more multi-cycle tightly coupled state machine functions which provide memory intensive application specific operational capability to each of the PEs in the $VSP_{16}$. For example, HA unit 147 interfaces with DSU 148 and LU 149 and the local data memory associated with PE4 114 as a transform engine 150.

Figure 2A:
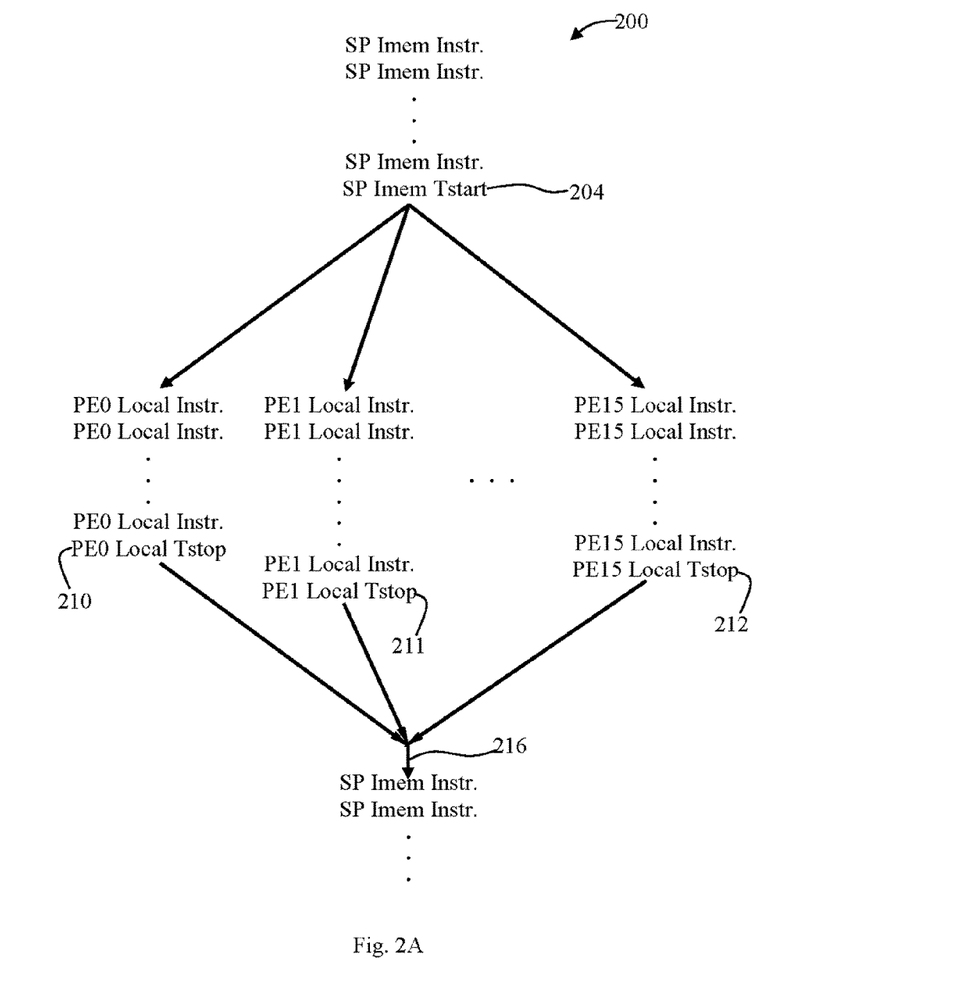
FIG. 2A illustrates a scalable thread flow chart of independent thread operations for the VSP$_{16}$ in accordance with the present invention.
Figure 2B:
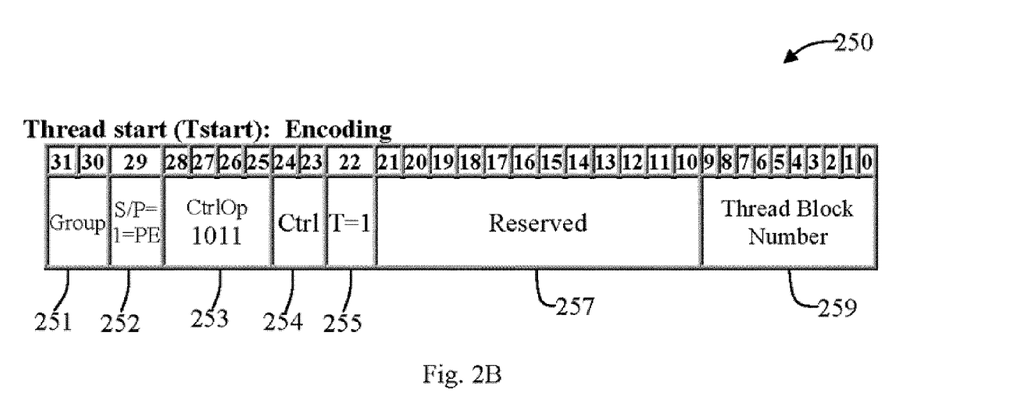
FIG. 2B illustrates an exemplary thread start (Tstart) instruction format, in accordance with the present invention.

FIG. 2A illustrates a scalable thread flow chart 200 of independent and scalable thread operations for the $VSP_{16}$. The SP controls the thread operation by issuing a thread start (Tstart) instruction 204 as illustrated in FIG. 2B. The Tstart instruction is fetched from SP instruction memory 142 and dispatched to the SP and generally to all enabled PEs. Upon receiving the Tstart instruction, a pre-decode pipeline stage determines that the instruction is a Tstart instruction and causes a SP-hold signal to be initiated. The SP-hold signal causes the SP to pause operations, enter a hold state, and stop fetching instructions. Each enabled PE switches to local independent PE operations. The local independent PE operations begin with fetching PE local instructions from PE instruction memory as described in more detail below. The PE instruction memory may store all types of PE instructions including a new type of PE control instruction that provide branching capabilities to each local PE and a thread stop (Tstop) instruction. As shown in FIG. 2A, each PE operates independently until its operations are complete, at which point each PE fetches a Tstop instruction 210-212. A Tstop instruction causes local PE-hold signals to be generated, stops the PE from fetching local PE instructions, and causes the PE to enter a local PE hold state. Since each PE operations are independent, each PE will generally have a different timing as to when it enters the PE hold state. Once all PEs have completed their local independent operations, the SP-hold signal is released, all PE local hold signals are released, and the SP continues with its fetching operation 216 from which it was paused. Depending upon the application, the SP pause may be allowed to be interrupted with suitable controls in place to, for example, pause the local independent PE operations while an interrupt is serviced. In one alternative, the SP pause may not be interrupted and, in this case, interrupts would be held pending until the SP is released back to its normal operation.

FIG. 2B illustrates an exemplary thread start (Tstart) instruction format 250. In this exemplary format 250, a group field 251 indicates this is a control instruction, a S/P bit 252 set to a 1 indicates this is a PE control instruction, a control opcode (CtrlOp) 253 set to a 1011 indicates this is a thread instruction, a control (Ctrl) field 254 is reserved as an opcode extension field, a T-bit field 255 set to a 1 is used to indicate the instruction is to he interpreted as a Tstart instruction. In addition, a reserved bit field 257 is available for future use in encoding thread parameters, for example. As an example of a thread parameter, a thread block number field 259 is encoded in bits 0-9 of the Tstart instruction format.

Figure 2C:
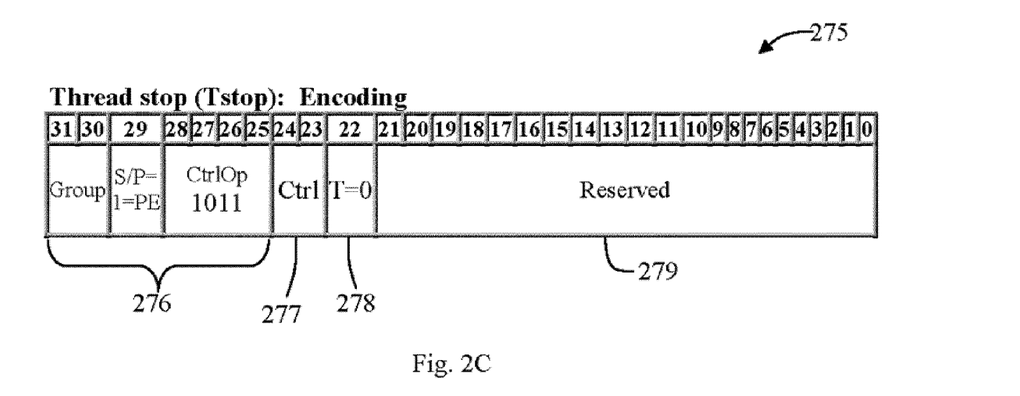
FIG. 2C illustrates an exemplary thread stop (Tstop) instruction format in accordance with the present invention.

FIG. 2C illustrates an exemplary thread stop (Tstop) instruction format 275. The group, S/P, and CtrlOp bit fields 276 may be the same as the corresponding bit fields 251, 252, and 253, respectively, of the Tstart instruction format 250. The control (Ctrl) field 277 is reserved as an opcode extension field, a T-bit field 278 set to a 0 is used to indicate the instruction is to be interpreted as a Tstop instruction. In addition, a reserved bit field 279 is available for future use in encoding thread parameters or provide other control bits, for example.

Generally, multiple blocks of code may be executed by each PE with each block of code beginning with a Tstart instruction and ending with the last PE completing its own local block operations. Each PE receives notification of which block to execute. This notification may be determined locally in each PE or by the parameter thread block number field 259 FIG. 2B passed by the Tstart instruction. Reserved fields 257 and 279 in FIGS. 2B and 2C are maintained in the Tstart and Tstop instructions for future use.

Figure 3:
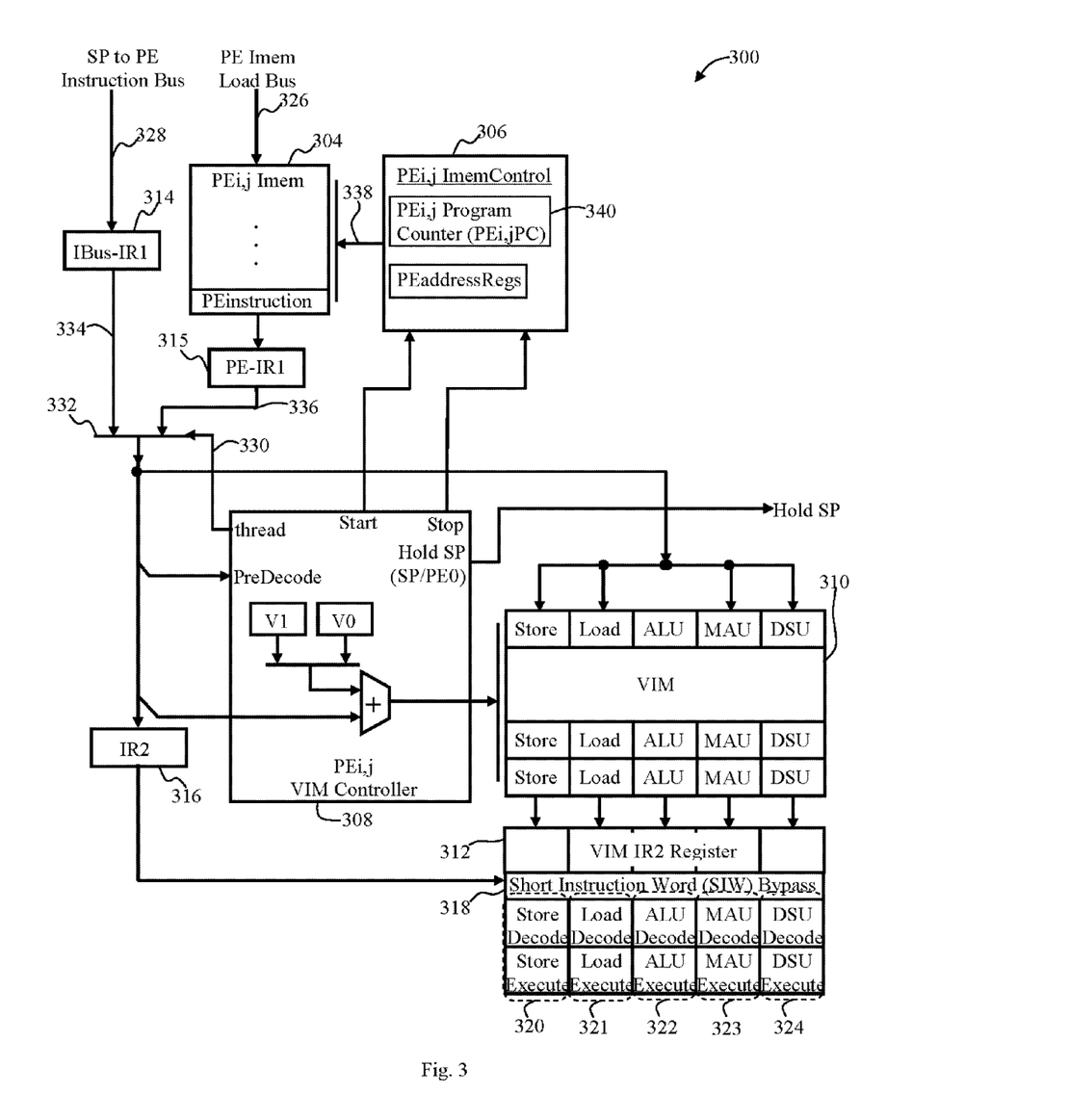
FIG. 3 illustrates a PE block diagram 300 focusing on a selectable independent local control of instruction sequencing in accordance with the present invention.

FIG. 3 illustrates a PE block diagram 300 focusing on a selectable independent local control of instruction sequencing. The PE contains a local Imemory (Imem) 304, a PEi,j Imem controller 306, a VIM controller 308, a VIM 310, a VIM IR2 register 312, an instruction bus instruction register 1 (IBus-IR1) 314, a PE instruction register 1 (PE-IR1) 315, a multiplexer 332, an instruction register 2 (IR2) 316, a short instruction word (SIW) bypass unit 318, and instruction decode and execute units 320-324. It is noted that other aspects of a PE, such as, a hardware assist unit, a data memory, a register file, DMA paths, and the like, are not shown in FIG. 3 for reasons of clarity in illustrating the selectable independent local control of instruction sequencing.

The local PE Imem 304 holds PE single instructions which can be store, load, ALU, MAU, and DSU short instruction words (SIWs) as well as unique PE control instructions. PE branch type instructions, PE execute VLIWs (PEXVs), and load VLIWs (LVs) instructions can be stored into each local PE Imem. PE instructions may be loaded into the PE Imem 304 over a PE Imem load bus 326 from a DMA path or from local PE memory. In one embodiment of the present invention, PE local Imems may be loadable using PE store special purpose register instructions (SSPR.Ps), which identifies a memory port in special purpose register (SPR) space. With this approach, the PE local Imems could all be loaded from their local data memories in parallel. The local data memories would be loaded with the local Imem contents by the DMA engines. Two SPR addresses would be needed, one to set the start address for instruction loads, the other acts as a data port. For example:

```
SSPR.P R0, IMEM_ADDR    // stores starting I-Mem address
SSPR.P R1, IMEM_INST    // stores inst to address, IMEM_ADDR is
                        // incremented automatically in hardware
LII R1, A0+, 1          // get next inst from PE local data mem
```

Putting the SSPR and load indirect with scaled immediate update (LII) instructions in a VLIW would allow single cycle loading of all PE I-Mems simultaneously.

In another embodiment of the present invention, the PE local Imems may be directly loaded by the DMA engines. A two port Imem would be used having a read port for use by the local PE to fetch instructions and a write port for use by a DMA engine to load instructions.

The PEs power on into a SIMD PE state of operation with the SP dispatching instructions to the SP and PEs on an SP to PE instruction bus 328. A thread signal 330 causes multiplexer 332 to select the IBus-IR1 signal path 334. When a Tstart instruction is received from the SP, it is predecoded causing the thread signal 330 to change state and each PE switches from a SIMD operating state to PE local operations. The thread signal 330 in the switched state causes multiplexer 332 to select the PE-IR1 signal path 336 beginning PE local operations. In PE local operations, each PE begins to select instructions from the PE local Imem 304 by generating fetch addresses 338 based on the contents of a processing element i,j program counter (PEi,jPC) 340. The SP enters a pause state such that the SP cannot send further instructions to the PEs until the pause state is removed. Rather the PEs execute their own independent instruction stream. At the completion of all the local PE tasks, the SP-hold signal is switched to an inactive state which releases the SP. The SP then resumes instruction fetch and dispatch operations. The PEs wait for the SP to send an instruction to the PE, which may be a PE instruction or another Tstart instruction.

Figure 4A:
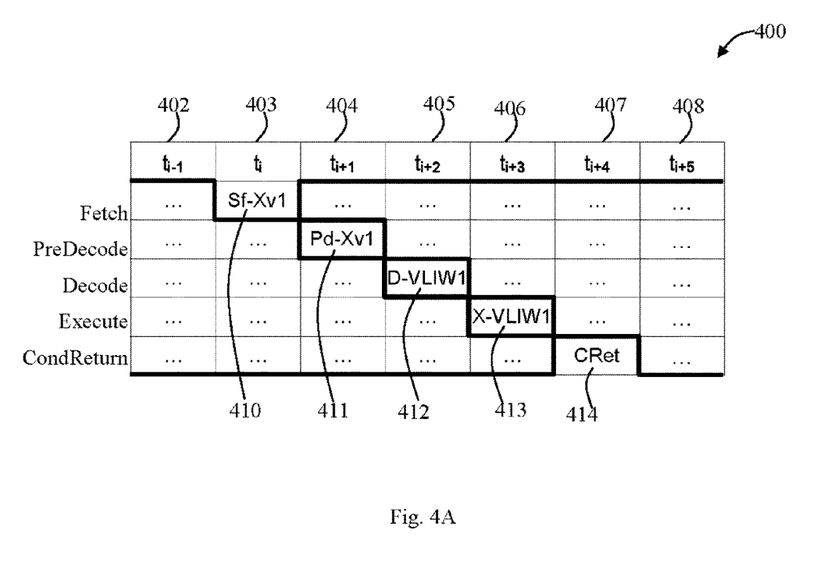
FIG. 4A illustrates a VSP$_{16}$ general SIMD pipeline in accordance with the present invention.

FIG. 4A illustrates a $VSP_{16}$ general SIMD pipeline 400. The SIMD pipeline 400 is shown with time periods $t_{i-1}$ 402, $t_i$ 403, $t_{i+1}$ 404, $t_{i+2}$ 405, $t_{i+3}$ 406, $t_{i+4}$ 407, and $t_{i+5}$ 408. The SP fetches and distributes a PE execute VLIW instruction (Sf-Xv1) 410 from SP instruction memory in $t_i$ 403. In $t_{i+1}$ 404, a predecode operation (Pd-Xv1) 411 determines a VLIW is to be fetched from local VIM, such as VIM 310 of FIG. 3. In $t_{i+2}$ 405, a decode operation (D-VLIW1) 412 decodes a VLIW1 fetched from the local VIM. In $t_{i+3}$ 406, the VLIW1 is executed (X-VLIW1) 413. In $t_{i+4}$ 407, conditions generated by the execution of the VLIW1 are returned (CRet) 414.

Figure 4B:
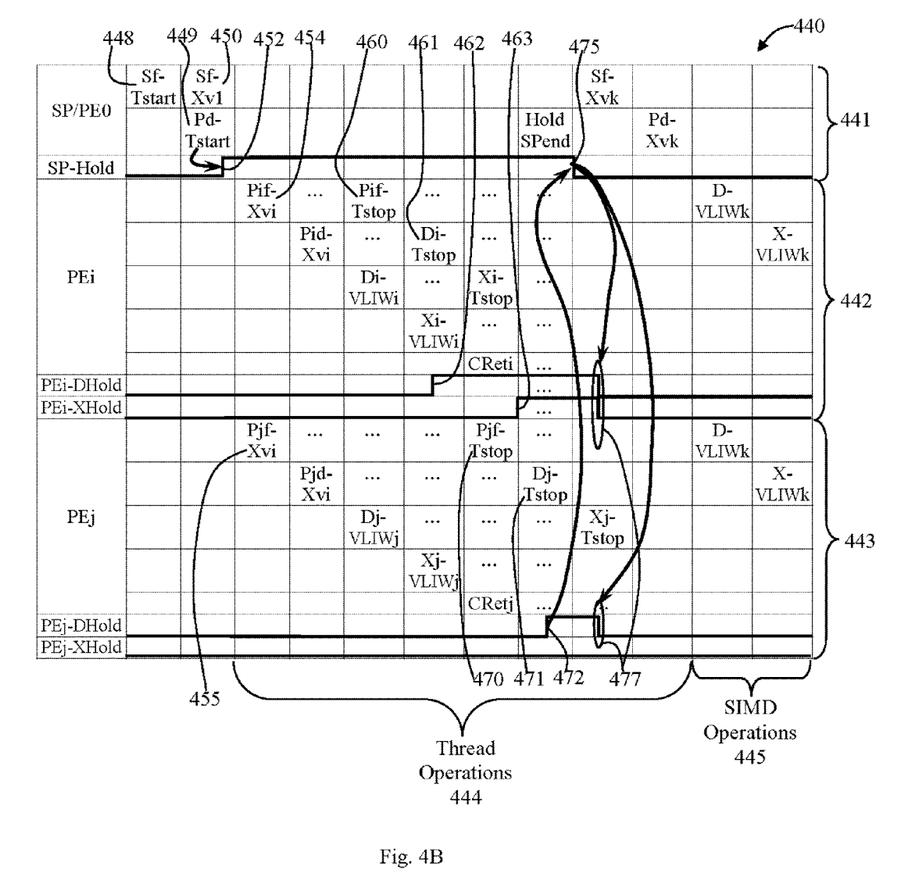
FIG. 4B illustrates thread pipeline operations on an SP and two PEs in accordance with the present invention.

FIG. 4B illustrates thread pipeline operations 440 on an SP and two PEs. The SP pipeline 441, a PEi pipeline 442, and a PEj pipeline 443 illustrate the starting of thread operations 444 and returning to SIMD operations 445. The SP fetches from the SP instruction memory 142 of FIG. 1 a Tstart instruction (Sf-Tstart) 448. The Tstart instruction is also distributed to and received at each enabled PE. The Tstart instruction is predecoded (Pd-Tstart) 449 in the SP while a fetch for the next instruction from SP instruction memory 142 is started (Sf-Xv1) 450. A SP-hold signal is activated at timing event 452 based on the predecoded Tstart instruction.

The Tstart instruction is also predecoded in each of the enabled PEs causing the enabled PEs to be placed in an independent mode of operation. The PEs begin fetching instructions from their local Imems, such as illustrated with PEi fetching an XV instruction (Pif-Xv1) 454 and PEj fetching an XV instruction (Pif-XV1) 455. The pipelines for these instructions continue in a predcode, decode, execute and condition return pipeline stages. PEi completes its local program operations when PEi fetches a Tstop instruction (Pif-Tstop) 460. When the Tstop instruction is predecoded in PEi (Di-Tstop) 461 a PEi decode hold signal (PEi-Dhold) at timing event 462 is activated. The active level of the PEi-Dhold signal 462 stops the PEi from fetching additional PEi instructions. When the PEi executes the Tstop instruction (Xi-Tstop) and generally all instructions in the PE have completed execution, a PEi execute hold signal (PEi-Xhold) is activated at timing event 463. The active level of the PEi-Xhold signal at timing event 463 generally stops all PEi operations. The active level of the PEi-Dhold signal 462 is sent back to the SP to indicate that PEi has started to hold further operations. Depending on pipeline controls and other system considerations, such as a PE instruction not completing execution, the PEi-Dhold signal at timing event 462 may be delayed before being sent back to the SP.

PEj completes its local program operations when PEj fetches a Tstop instruction (Pjf-Tstop) 470. When the Tstop instruction is predecoded in PEj (Dj-Tstop) 471 a PEj decode hold signal (PEj-Dhold) is activated at timing event 472. The active level of the PEj-Dhold signal at timing event 472 slops the PEj from fetching additional PEj instructions. The active level of the PEj-Dhold signal at timing event 472 is sent back to the SP to indicate that PEj is starting to hold further operations. In this example, PEj is the last PE to finish its local program operations. All other PEs that have completed local program operations earlier will have sent a PEx-Dhold signal to the SP. The last PEs, such as PEj, generally completing operations and having sent the PEj-Dhold signal to the SP, the SP having received all PEi-Dhold signals from the enabled PEs deactivates the the SP hold signal at timing event 475.

The SP hold signal is distributed to all PEs. With the SP hold signal deactivated, the PEs release their hold signals at timing event 477 which causes the thread signal 330 of FIG. 3 to switch slate which enables multiplexer 332 to select the IBus-IR1 314. The PEs wait for a new instruction to be distributed to them from the SP.

To minimize pipeline latencies to switch from the PE local operations back to SP SIMD operations, the Tstop instruction may be architected to execute a number of PE instructions after (in the shadow of) the Tstop instruction. The number of PE instructions to execute may be fixed or determined by a parameter passed in the Tstop instruction.

Figure 5:
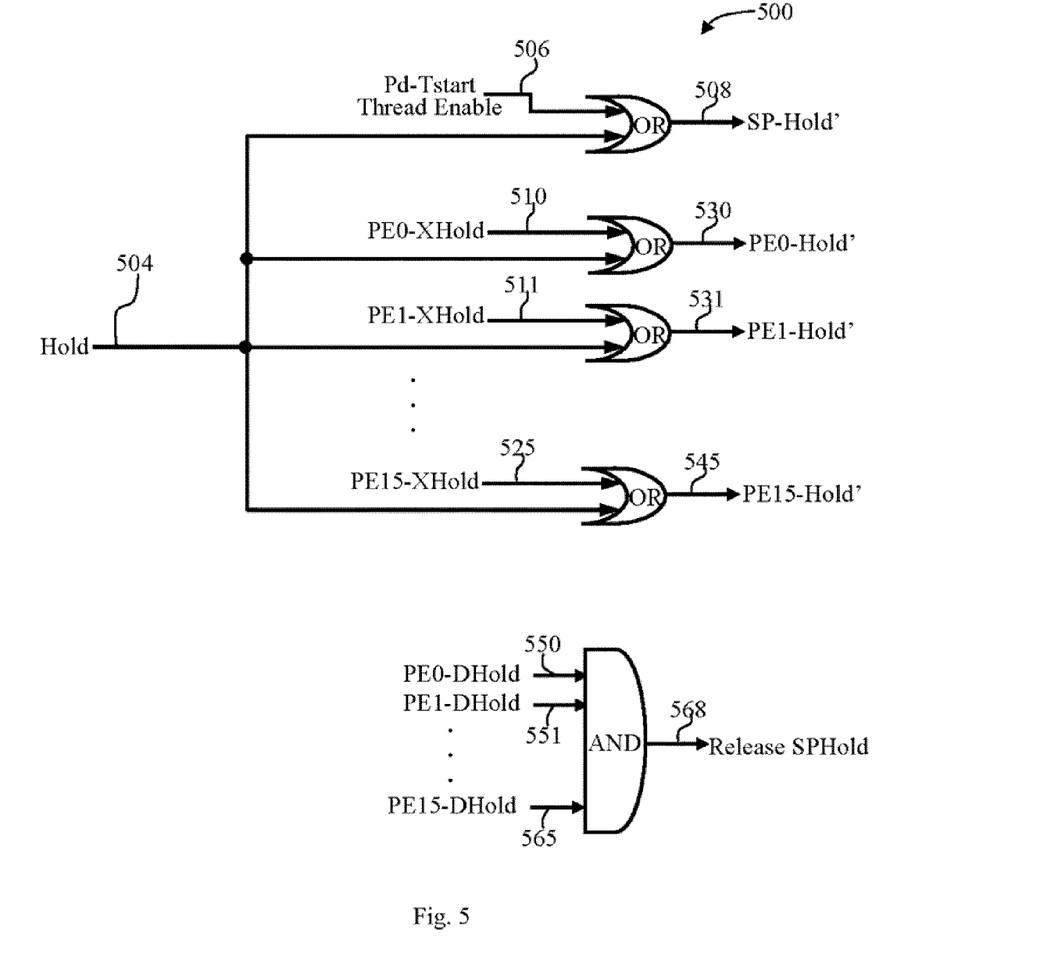
FIG. 5 illustrates exemplary distributed hold signals for an SP and an array of sixteen PEs in accordance with the present invention.

FIG. 5 illustrates exemplary distributed hold signals 500 for an SP and an array of sixteen PEs. A hold signal 504 may be generated, for example, from the SP whenever a fetch operation takes longer than expected to complete. If an instruction fetch is held up for more than one cycle, a hold signal 504 is generated causing the SP and array of PEs to pause pending receipt of the fetched instruction. For PE thread operations, individual hold signals are generated. The SP logically ORs a pre-decode (Pd)-Tstart Thread Enable signal 506 with the hold signal 504 to generate an SP-hold' 508. The Pd-Tstart Thread Enable signal 506 is activated upon predecoding a Tstart instruction and deactivated when the SP has received all of the PEs decode hold (PEi-DHold) signals.

Each PE ORs a PEi-execute hold signal (PEi-XHold) signal 510, 511, . . . , 525 hold 504 to generate PEi-Hold' signals 530, 531, . . . , 545. Each PEi-Xhold signal 510, 511, . . . , 525 is activated upon predecoding a PE Tstop instruction and deactivated when the SP hold' signal is deactivated. The SP-Hold' signal is released the cycle after all PEs have activated their PEi-DHold signals 550, 551, . . . , 565. An exemplary AND gate may be used to AND all PEi-Dhold signals 550, 551, . . . , 565 to generate a releast SP Hold signal 568.

A SP pause counter may be used that is snap shot whenever a PE completes its independent operations. In addition and as an example, a 4-bit flag may be sent by each PE to indicate a number of status conditions. The PE number, the 4-bit status flag, and the snap shot pause counter value may be stored in an SP local memory.

While the present invention has been disclosed in the context of various specific illustrative embodiments, it will be recognized that the invention may be suitably applied to other environments and applications consistent with the claims which follow.

We claim:

1. An apparatus for parallel processing comprising:
    a plurality of processing elements (PEs);
    a control processor merged with one PE of the plurality of PEs to form a merged processor sharing a control function and a PE function of the one PE, the control function for fetching and distributing single instruction multiple data (SIMD) instructions to the control function and the plurality of processing elements (PEs), wherein the merged processor shares execution units between the control function and the PE function and one of the SIMD instructions is a thread start (Tstart) instruction which is received and interpreted by the control function and causes the control function to pause its instruction fetching and enter a hold state;
    a local PE instruction memory (PE Imem) associated with each PE and containing local PE instructions for execution locally on the associated PE;
    a local PE very long instruction word (VLIW) memory associated with each PE and containing at addressable locations local PE VLIWs each having a plurality of slot instructions for execution in parallel locally on the associated PE; and a VLIW memory (VIM) controller in each PE that is used to select between the distributed SIMD instructions, the local PE instructions fetched from the local PE Imem, and the local PE VLIWs fetched from the local PE VLIW memory, wherein each PE is initialized to receive the distributed SIMD instructions and wherein each PE receiving the Tstart instruction causes instruction path selection logic to switch from receiving the distributed SIMD instructions to fetching the local PE VLIWs, each VLIW fetched in response to a fetched local PE instruction, wherein a PE hold signal is activated in response to predecoding a thread stop instruction in a predecode pipeline stage prior to decoding and execution pipeline stages used for the local PE instructions and wherein the thread stop instruction is specified to execute one or more PE instructions in the shadow of the thread stop instruction.

2. The apparatus of claim 1 wherein each PE further comprises local hold generation logic that is responsive to the thread stop instruction fetched from the local PE Imem to generate a PE hold signal which is returned to the control function.

3. The apparatus of claim 1 wherein the PE hold signal stops fetching any further local PE instructions from the local PE Imem.

4. The apparatus of claim 1 wherein each PE is an enabled PE.

5. The apparatus of claim 1 wherein the merged processor further comprises distributed hold control logic responsive to activate a control function hold signal based on the control function receiving the Tstart instruction.

6. The apparatus of claim 5 wherein the distributed control logic is responsive to PE hold signals received from each PE to deactivate the control function hold state upon receipt of all PE hold signals generated and reactivate the control function from where the instruction fetching was paused.

7. A method of enabling multiple instruction multiple data (MIMD) very long instruction word (VLIW) operations in a single instruction multiple data (SIMD) array processor, the method comprising:

receiving a plurality of thread start (Tstart) instructions in the SIMD array processor, one Tstart instruction in a control processor and an individual Tstart instruction of the plurality of Tstart instructions in each enabled processing element (PE) of a plurality of enabled PEs;

generating a pause state in the control processor in response to at least one individual Tstart instruction received in at least one enabled PE, wherein the pause state pauses the control processor from fetching and distributing instructions to the plurality of enabled PEs;

switching instruction paths in each enabled PE to a local PE instruction memory (PE Imem) in response to the individual Tstart instruction received in a very long instruction word memory (VIM) controller located in each enabled PE;

fetching instructions from the local PE Imem at PE Imem addresses generated independently in each enabled PE for execution of VLIWs accessed from a VIM at indirect VIM addresses generated locally on each enabled PE in response to the instructions from the local PE Imem;

receiving the individual Tstart instruction of the plurality of Tstart instructions in each enabled processing element (PE) based on a block of code to be executed in each enabled PE that begins with the individual Tstart instruction and ends with a thread stop instruction;

receiving a stop fetching indication in each enabled PE in response to predecoding the thread stop instruction at completion of a sequence of PE instructions; and executing one or more PE instructions in the shadow of the thread stop instruction.

8. The method of claim 7 further comprising:

generating a PE hold signal locally in each enabled PE in response to a stop fetching indication generated locally on each of the enabled PEs to stop the enabled PEs from further fetching local instructions.

9. A method for executing very long instruction words (VLIWs) separately on individual processing elements (PEs), the method comprising:

receiving a thread start (Tstart) instruction in a control processor and in a plurality of enabled processing elements (PEs);

generating a hold signal in a predecode pipeline stage of the control processor based on the Tstart instruction to pause the control processor from fetching and distributing instructions to the plurality of enabled PEs;

switching instruction paths in each enabled PE to a local PE instruction memory (PE Imem) in response to the Tstart instruction received in a very long instruction word memory (VIM) controller located in each enabled PE;

fetching a PE execute VLIW (PEXV) instruction from the local PE Imem in each enabled PE;

predecoding the PEXV instruction in a predecode pipeline stage separately on each enabled PE that fetched the PEXV instruction to select a VLIW having a plurality of slot instruction from a VLIW memory located on each enabled PE, to decode the plurality of slot instructions in a decode pipeline stage following the predecode pipeline stage, and to execute the plurality of slot instructions in parallel on each enabled PE;

executing a Tstop instruction from the local PE Imem that is specified to execute one or more PE instructions in the shadow of the Tstop instruction; and executing one or more PE instructions in the shadow of the Tstop instruction.

10. The apparatus of claim 1, wherein the Tstart instruction contains a thread block number that identifies a block of code in the local PE Imem to be executed locally on each PE.

11. The apparatus of claim 1 further comprising:

a control function instruction memory from which the SIMD instruction are fetched by the control function for distribution to the control function and the plurality of PEs.

12. The method of claim 7 further comprising:

initializing each enabled PE to receive instructions distributed by the control processor.

13. The method of claim 7, wherein a starting address of the instructions fetched from the local PE Imem is determined in each enabled PE in response to the Tstart instruction.

14. The method of claim 7, wherein the Tstart instruction contains a thread block number that identifies a block of code in the local PE Imem to be executed locally on each enabled PE.

15. The method of claim 9 wherein the Tstart instruction contains a thread block number that identifies a block of code in the local PE Imem to be executed locally on each enabled PE.

* * * * *